3,260,574
PYROLYTIC CARBON DECLADDING

Loranus P. Hatch, Brookhaven, James J. Reilly, Bellport, and Edward Wirsing, Jr., Mattituck, N.Y., assignors to the United States of America as represented by the United States Atomic Energy Commission
No Drawing. Filed Nov. 20, 1963, Ser. No. 325,190
1 Claim. (Cl. 23—324)

This invention is related to the recovery of fissile fuel values from pyrolytic carbon coated fissle fuel containing bodies. More particularly, it relates to a process for the separation of pyrolytic carbon claddings from the core of a nuclear fuel element.

Pyrolytic carbon is a carbon compound similar in chemical composition to graphite but is not structurally akin to graphite. Graphite is essentially two-dimensional in that it has substantially flat layer planes where the c-c band difference is much smaller in the planes than it is between the planes. Thus, lamellar compounds (compounds other than carbons) are readily formed or introduced between the planes causing the delamination of graphite. On the other hand pyrolytic carbon which generally does not have the ideal spacing, has layers which are turbostratic with respect to each other and many more carbon atom cross-linkages exist between the layers than exist between the layers of graphite, thus rendering it far more difficult to introduce lamellar compounds into pyrolytic carbon materials. The "C" axis (distance between layer planes) as measured by X-ray in graphite is $K_x$ 6.72 whereas if it is appreciably larger, e.g., $K_x$ 6.75 or greater it is pyrolytic carbon.

Pyrolytic carbon is an amorphous form of carbon in which crystallites are small (about 25 A. across), randomly orientated and turbostratic in layer arrangement. In other words, they are made up of randomly aligned small stacks of parallel, but randomly rotated graphitic planes. Methods of preparation and properties of such materials are more fully described in an article by Claude A. Klein, entitled, "Pyrolytic Graphite," published in the August 1962 issue of International Science and Technology at pages 60 through 68.

Pyrolytic carbon is relatively impervious to attack from chemical reagents and is utilized as a coating on uranium dicarbide cores to provide an impermeable mechanically tough protective coating on the fissile fuel bearing cores. After such fissile fuel cores are spent, having been employed in forming the core of a nuclear power reactor, there remains much unexpended uranium which must be recovered from the cores to render power production from such a source economical. However, the properties such as resistance to chemical attack and impermeability which favor the selection of pyrolytic carbon as a protective coating in the production of the spheres have tended to militate against its use because these very properties increase enormously the cost of recovering unspent uranium values from the spheres after they have been utilized in a nuclear power reactor.

The method previously examined and proposed by the art for recovering the uranium values from such pyrolytic carbon coated nuclear fuel elements has been to mechanically crush the elements in order to fracture the pyrolytic carbon coating to expose the uranium values contained in the elements. Thereafter the exposed uranium values are then removed from the core by dissolving them in nitric acid or some other conventional recovery process. Rupturing of the coatings requires the use of mechanical crushers which must be remotely controlled because of the inherent radioactivity of the materials. Such remote controlled mechanical equipment is very expensive as well as difficult and costly to maintain and repair.

It is an object of this invention to provide an efficient economical process for removal of pyrolytic carbon from pyrolytic carbon clad bodies.

Another object of this invention is to provide an efficient, economical process for the decladding of pyrolytic carbon from pyrolytic carbon clad nuclear fuel elements.

A further object of this invention is to provide an efficient economical process for recovering fertile fuel from pyrolytic carbon clad nuclear fuel elements wherein the clad element is decladded and thereafter the fertile fuel is recovered, with the decladding and recovery operations being carried out in the same reactor vessel.

Other objects of this invention will be obvious, and will, in part, appear hereinafter.

We have unexpectedly discovered that pyrolytic carbon cladding can readily be decladded from pyrolytic carbon clad fissile material bearing bodies by intimately contacting pyrolytic carbon clad fissile material bearing bodies with a gaseous stream of a decladding mixture composed of gaseous oxygen containing solid particles, i.e., aluminum oxide particles, at temperatures about 675° C. The oxygen in the decladding mixture is employed both as the carrying medium for the particles contained in the mixture and as well as a reactant in the process for effectuating the decladding. By the term "fissile material bearing bodies" as used in this invention is meant conventional pyrolytic carbon coated fuel fissile nuclear compositions as well as spent pyrolytic carbon coated fissile nuclear fuel compositions, e.g., uranium, thorium, platinum, mixtures thereof as well as monocarbides and dicarbides thereof. The pyrolytic carbon coated fissile materials may even be dispersed in graphite.

We have found that our novel process is ideally suited to and preferentially carried out in a fluidized bed with a bed made up of particles containing aluminum oxide solids and the gaseous oxygen being utilized as the fluidizing medium for the bed. The use of fluidized beds per se is well known to those skilled in the art and need not be explained or further elaborated upon in this application except for those explanations given herein to more adequately explain our novel process.

Those skilled in the art are well aware of the fact that very rapid oxidation of pyrolytic carbon will occur merely by contacting the pyrolytic carbon clad bodies with oxygen alone at the temperatures employed in our process, creating a very hazardous condition. Such rapid oxidation in a conventional furnace vessel could possibly result in destruction of the vessel and spread of the radioactive contents contained in the vessel throughout the surrounding environment.

In the preferred embodiment of our invention, pyrolytic carbon clad bodies such as whole pyrolytic carbon clad uranium bearing nuclear fuel elements are immersed in a fluidized bed, whose bed portion contains aluminum oxide particles, which aluminum oxide particles are all capable of passing through a 40 mesh/inch screen, ⅓ by weight of the particles being incapable of passing through a 60 mesh screen, ⅔ by weight of the particles being incapable of passing through a 90 mesh/inch screen and none of the aluminum oxide particles being capable of passing through a 120 mesh/inch screen. Thereafter fluidizing the bed and intimately contacting the element immersed therein with gaseous oxygen while regulating the bed at a temperature above about 675° C. until the desired degree of decladding is achieved. In general it has been found preferable to fluidize the particles of the bed at a low magnitude of bed expansion during the oxygenation steps found useful in our novel process.

The oxidation of the element in accordance with our novel process can be carried out with pure oxygen or with any gaseous mixture containing oxygen and gases which are chemically compatible with our system such as atmospheric air. However, the rate of oxidation of the pyrolytic carbon cladding increases with the proportion of oxygen contained in the oxidizing gas and in the preferred embodiment of our invention we use pure gaseous oxygen. During the oxidation step when temperatures below 675° C. are employed, the rate of oxidation is too low, rendering the proces uneconomical.

The point at which the contacting of the body with the decladding mixture is determined to be complete is the point at which analysis of the off gas shows that no CO and/or $CO_2$ is contained therein. When it is desired to recover uranium from a fissile fuel bearing pyrolytic carbon clad nuclear fuel element all one need do is wait until the pyrolytic carbon cladding is completely decladded or sufficiently decladded so that the uranium contained therein is adequately exposed for further recoverey thereof by conventional uranium recovery processes.

In the preferred embodiment of our invention the bed is fluidized by the passage of pure oxygen through the bed at a superficial velocity of about 0.7 ft./sec. while maintaining the bed temperature at about 700° C. until all the carbon is removed as $CO_2$ or CO.

In the preferred embodiment of our invention after a pyrolytic carbon clad fissile fuel bearing nuclear fuel element has been decladded, so that the fissile fuel contained therein is adequately exposed so that it can be recovered, the passage of oxygen through the bed is stopped and gaseous fluorine is then passed through the bed and the exposed fissile fuel in the reactor vessel is contacted with the fluorine gas by intimately contacting and fluidizing the bed particles with gaseous fluorine by passing fluorine through the bed at a superficial velocity of about 0.6 ft./sec. while regulating the bed at a temperature ranging from about 400° C. to about 450° C. The passage of fluorine through the bed during this uranium recovery step is carried out until the uranium contained in the reactor vessel is converted to uranium hexafluoride and the resulting product, gaseous uranium hexafluoride which evolves from the reactor vessel is passed through filters to remove any particulate matter which may be entrained therein and is thereafter condensed and further treated by conventional means well known to those skilled in the art to recover the uranium therefrom.

Of course after the pyrolytic carbon cladding has been decladded from and/or the uranium is adequately exposed by treating a pyrolytic carbon clad fissile fuel bearing nuclear fuel element by means of our novel process any conventional fissile fuel recovery step or process can be employed to recover the exposed uranium. However, for the sake of economy, simplicity and ease of operation in the preferred embodiment of our invention, the exposed fissile fuel is recovered by means of passage of gaseous fluorine through the bed. It is readily apparent that not only is our process efficient but great economies are gained when it is employed to recover fissile fuel values from pyrolytic carbon clad fissile fuel bearing nuclear fuel elements since it permits the reuse of a single reactor vessel and bed to recover the fissile fuel values from many nuclear fuel elements which elements can be sequentially processed in the same vessel and bed thus sharply reducing the amount of radioactive waste evolved in the reprocessing of the elements.

The size of the bed particles can vary widely since the chief limitation on the size of such particles is that they be capable of being fluidized. The bed particles of our invention can be made up of any materials which are chemically inert to the reactants utilized in our novel process. The size range of such fluidizable particles is well known to those skilled in the art and our invention is not to be construed as limited to any specific sized particles.

Construction of fluid bed reactors and the operation thereof are well known to those skilled in the art. Those skilled in the art readily realize that ratio of the amount of bed material to body to be decladed in our novel process will of course be dependent upon the geometric configuration and shape of both the reactor vessel and the element to be decladded. Our invention is not to be construed as limited to any particular size or shape of reactor vessel and/or fuel element. Illustrative of the ratios of the weight of bed material to the weight of the element that have been found useable in our invention range from between about 25:1 to about 5:1. However, such a range of ratios cannot be construed as limiting the scope of our invention because it is merely representative of the range found useable by the inventors and permissible variations inherently permitted by our process will permit these ranges to be exceeded by wide margins.

The following example is given merely to illustrate the practice of our novel invention and in no way is to be construed as limiting the scope of our invention.

EXAMPLE

*Apparatus*

The fluidized bed reactor vessel was constructed of nickel. It had a lower section 2" I.D., approximately 36" long. The upper section, which served as a particle deentrainment chamber, is 4" I.D. and 12" long. The reactor is fitted with three thermocouple wells which enter through a flange at the top of the vessel. The bottom of the reactor was conical in shape and was fitted with a ball check which prevented bed material from running out of the reactor and also improved distribution of the fluidizing gas. The bottom of the cone is attached to ½" nickel tubing through which the fluidizing and reactant gases are introduced. Off gases are exited through ½" tubing attached to the top flange of the reactor. Both the reactor and other system components were heated by Nichrome wire resistance heating circuits. The off-gas was connected to a packed bed filter of granular aluminum oxide which served to remove entrained particles from the gas stream. After passing through the filter, the off-gas line was split into two sections. One section vented directly to the atmosphere and was used during oxidation only; the other section was used during fluorination and was connected to a $UF_6$ condenser cooled by Dry Ice and trichloroethylene (−60° C.). Exit gases from the condenser were conducted in ½" line to a caustic scrubber in which excess fluorine was removed from the off-gas stream. Inert gases which passed through the scrubber were vented to the atmosphere.

*Reagents and sample*

Sample —Total weight 22 gms.
Fluid bed material—2000 gms. of R.R. Alundum ($Al_2O_3$) from Norton Co., −40 mesh/inch+120 mesh/inch particle size
Nitrogen—($N_2$) prepurified
Oxygen—($O_2$) Dry
Fluorine—($F_2$)

*Procedure*

With the top flange of the reactor removed, 2000 gms. of bed material were introduced into the reactor. The sample was immersed in the bed. The sample used in this example consisted of pyrocarbon coated spheres having an average overall diameter of about 180 microns, with a core made up of uranium dicarbide having an average diameter of about 30 mircrons. The spheres were immersed in graphite. The total weight of the sample used was 22 grams, and the sample contained about 1.19 grams of uranium. During assembly the bed was fluidized with nitrogen gas so that the gas passed up through the bed at a superficial velocity of ∼0.6 ft./sec. When fluidized the bed offers no resistance to the immersion of the thermocouple sample assembly. Fluidization with $N_2$ was continued and the reactor heated to 650° C. at which point 100% oxygen was substituted for nitrogen gas as the fluidizing medium. Oxygen was passed through the bed until no $CO_2$ or CO was detected in the off gas. During the oxidation step the packed bed filter was maintained at 650° C. in order to react trapped carbon containing fines which were originally entrained in the reactor off gas. The oxidation was continued for about 1½ hours. It was during this period that the pyrolytic carbon cladding of the fuel element sample was removed and the uranium dicarbide was converted to uranium oxide. After oxidation, the reactor was cooled to 450° C. and a mixture of 25% fluorine and 75% argon was passed through the reactor for ½ hour at a superficial velocity of ~0.6 ft./sec. During this period, uranium was removed from the reactor as $UF_6$, passed through the filters and condensed in the cold trap (−60° C.). During the final fluorination the off-gas lines were heated to 100° C. (to prevent $UF_6$ condensation and line plugging) while the filter is heated to 400° C. so that any uranium in the filter is fluorinated and removed as $UF_6$. After the fluorination, the reactor was cooled and uranium was recovered from the cold traps by washing. A total of 1.19 grams of uranium was recovered from the sample.

Thus it is readily apparent that our invention provides a highly efficient, economical, safe, easy to operate process for recovering uranium from pyrolytic carbon clad uranium bearing nuclear fuel elements. In this example we have employed a reactor vessel constructed of nickel. However, due to the corrosive effects resulting from use of our process, it would be advisable to use a more corrosion resistant material such as Inconel in the construction of reactor vessels in which our process is to be employed on a commercial scale. The term "screen size" as employed in this application refers to U.S. Standard Sieve Series (1940).

Having described our invention, what we claim as new and desire to secure by Letters Patent is:

A process for recovering uranium from pyrolitic carbon clad uranium bearing nuclear fuel element comprising:

(a) immersing said element in a fluidized bed, (b) said bed being composed of the particles of aluminum oxide, (c) fluidizing said bed containing said fuel element with an oxygen containing gas, while maintaining the temperature of said bed at a temperature above about 675° C., until the uranium contained in said element is exposed;

(d) fluidizing said bed and intimately contacting and reacting said exposed uranium with gaseous fluorine, while maintaining the temperature of said bed at a temperature ranging from between about 400° C. to about 450° C. until the uranium in said bed is reacted with fluorine, and thereafter (e) recovering the uranium from the reaction product of uranium and fluorine gas.

References Cited by the Examiner
UNITED STATES PATENTS

| | | | |
|---|---|---|---|
| 2,992,891 | 7/1961 | Sellers | 23—14.5 |
| 3,098,709 | 7/1963 | Mecham et al. | 23—14.5 |

BENJAMIN R. PADGETT, *Primary Examiner.*

S. TRAUB, *Assistant Examiner.*